March 13, 1956   P. ROBINSON ET AL   2,738,453
ELECTRICAL CONDENSER AND METHOD OF MAKING IT
Filed Sept. 27, 1949
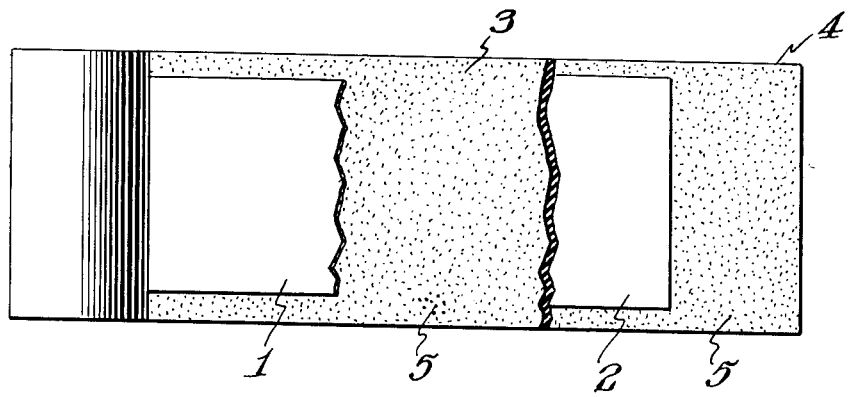
INVENTORS:
P. ROBINSON
and D.B. PECK
BY
*Arthur J. Connolly*
THEIR ATTORNEY

# United States Patent Office 2,738,453
Patented Mar. 13, 1956

2,738,453

ELECTRICAL CONDENSER AND METHOD OF MAKING IT

Preston Robinson and David B. Peck, Williamstown, Mass., assignors to Sprague Electric Company, North Adams, Mass., a corporation of Massachusetts Application September 27, 1949, Serial No. 118,198

12 Claims. (Cl. 317—258)

This invention relates to improved electrical devices and more particularly refers to resin impregnated condensers and coils of various sorts.

The impregnation of electrical devices with various resins or materials which can be polymerized to resins is a well known expedient. Numerous publications suggest the impregnation of electrical condensers and cables with monomeric styrene, followed by polymerization in situ. This has never met with commercial success since the styrene does not completely polymerize, but leaves some undesirable monomer. Another disadvantage is the propensity of styrene to contract upon polymerization, producing voids and cracks within the impregnated assembly. If the residual monomer is driven off by heat, even more voids are produced, further impairing the product.

Other publications teach the impregnation of condensers and cables with solutions of polymerized styrene. By this procedure, it is possible to avoid the presence of the electrically undesirable styrene monomer. However, the voids left when the polymer solvent is removed are still objectionable, since they lead to lower breakdown voltage and humidity resistance for the dielectric. A secondary impregnation with polystyrene solution is ineffective since the initial resin swells upon contact with the solvent, increases the solution viscosity and prevents satisfactory impregnation.

Another publication suggests the initial encapsulation of a transformer in a resin by dipping the transformer in a viscous partially polymerized mass. The coating is then further polymerized. The transformer is thereafter impregnated as completely as possible with a less viscous polymerizable material. Here again voids are produced, and the impregnant may dissolve the encapsulating material causing leakage.

It is an object of this invention to overcome the foregoing and related disadvantages. A further object is to produce rigid and durable electrical components, particularly electrical condensers. The invention is also concerned with a novel process for encasing electrical components and making them non-deformable. Additional objects will become apparent from the following description and claims.

These and other objects are obtained in accordance with our invention which in one embodiment is directed to a plurality of conductors separated by dielectric spacing material of a porous resin, the pores of which are impregnated with a different and incompatible resin. In one of its preferred embodiments our invention is concerned with an electrical condenser comprising convolutely wound electrode foils separated by a porous cellulose ester resin, the pores of which are impregnated with an in compatible polyvinyl resin. In another preferred embodiment, our invention pertains to an electrical condenser comprising convolutely wound electrode foils separated by porous paper, the pores of which are filled with two substantially incompatible synthetic resins.

We have discovered that a dual resin dielectric can be produced as a substantially solid body by the herein-described procedure. By means of this invention we produce a solid dielectric substantially free from voids, cracks, strains and the other faults and flaws characteristic of prior resin impregnated assemblies. In accordance with this invention, we first treat the assembly with a resin which solidifies as a porous mass. The porous initially treated body is then treated with a different resin which is incompatible with the first resin. The second resin is advisably introduced as a polymerizable monomer, and polymerized in situ. The final dielectric is a non-porous substantially solid body containing two incompatible resins. Increased breakdown voltage, increased rigidity and durability, increased resistance to humidity and other desiderata characterize our finished assemblies, when they are compared to similar assemblies impregnated with monomeric styrene, polystyrene solutions etc. as heretofore suggested.

In the practice of our invention the percentage porosity in the assembly after the first treatment should generally be between about 5% and about 30%. For optimum application the porosity should be in the neighborhood of 10% prior to the second treatment.

In referring to the first treatment it should be pointed out that this does not require an impregnation operation but may be effected by the use of resin films, such as spacing materials and insulation heretofore employed in electrical assemblies. Alternately a porous paper may be treated with the initial resin prior to winding or wrapping into the assembly. This treatment is most readily applied to one side of the paper, but highly satisfactory results may be obtained with paper completely impregnated or coated with the initial resin. Further, electrode foils, wires etc. may be coated with the porous resin prior to winding.

Our invention may be applied in a number of different fields, but is particularly suitable for the treatment of electrical assemblies capable of impregnation. Electrical condensers, coils, chokes, transformers, resistors, circuits, etc. are among the devices for which the invention is especially adapted. The preparation of improved electrical condensers represents a preferred embodiment of the invention.

We have found the following resins suitable for the initial treatment:

| Resin | Preferred Mode of Application |
|---|---|
| Cellulose acetate | From solvent or plasticized film. |
| Cellulose butyrate | Do. |
| Cellulose nitrate | Do. |
| Cross-linked vinyl copolymers (e. g. styrene plus divinyl-benzene) | As monomeric impregnants. |
| Phenol-formaldehyde condensation products | Partially polymerized solution. |
| Urea-formaldehyde condensation products | Do. |
| Melamine-formaldehyde condensation products | Do. |
| Polyvinylacetal resins | Solution or dielectric film. |
| Polytetrafluoroethylene resins | Dielectric film. |

The cellulose esters are usually applied from solvent solutions, preferably having a solids content of from about 2% to about 30% by weight. Suitable solvents include acetone, other ketones, etc.

Condensation resins are usually applied in a partially condensed state and may be thinned in a solvent. Condensation is completed after incorporation into the assembly by means of heat and/or catalytic agents.

The cross-linked copolymers are advisably applied by impregnation of the monomer mixture into the assembly, followed by polymerization-in-situ.

The use of the tetrahaloethylene resins is possible with dispersion techniques or by use of a porous, massive film.

An emulsion of very fine particles of the resin, for example, may be used to impregnate the assembly. Thereafter, the dispersing medium may be removed by heat and/or vacuum and the particles of resin, sintered together.

The polyvinyl acetal resins are advisably applied in solution or emulsion, or employed as flexible dielectric films.

The second class of resins, used to impregnate the foregoing initial resins, includes materials which may be applied without the use of solvents or similar media, as these media leave voids, cracks etc. within the assembly. For this purpose polymerizable vinyl compounds other than those employed as the initial resin are particularly suited. It is essential, however, that the impregnant be substantially incompatible with the first resin material. (The compatibility or incompatibility of two resins may be readily determined in accordance with well known procedures.) Representative vinyl compounds, which can be polymerized in situ, and are suitable for use as the impregnating resin are the following:

| | |
|---|---|
| Styrene | 3-vinyl dibenzofuran |
| o- and p-Chlorostyrene | Vinyl diphenyl oxide |
| 2,5-dichlorostyrene | Vinyl diphenyl ether |
| 3,4-dichlorostyrene | Vinyl phenothiazine |
| 2,3,4,5,6-pentachlorostyrene | Vinyl benzotrifluoride |
| 2-vinyl thiazole | Divinyl benzene |
| N-vinyl carbazole | |

The monomeric or low polymeric impregnating material is usually introduced in the molten (liquid) state, and thorough impregnation may be accomplished by use of alternating vacuum and pressure. Following impregnation, the vinyl compound may be polymerized-in-situ by application of heat, ultraviolet light, etc., and thus converted to a solid, non-porous resinous material. While vinyl compounds have been listed above, it is to be understood that other polymerizable materials having similar characteristics may be used, e. g. diallyl phthalate, allyl cinnamate, dihydronaphthalene, cumene, etc. The heat and time required for polymerization are interdependent and are also dependent upon the amount of catalyst present, if any. In most cases, we polymerize at a temperature between about 80° C. and 150° C. for between about 1 hour and 48 hours. An inert atmosphere is preferred for polymerization, since air often will interfere with this reaction, while acidic gases, e. g. $H_2S$, moist $CO_2$ etc., may accelerate polymerization of the exposed vinyl compound.

It is often desirable to include an electrically inert plasticizing material in the impregnant, to reduce the brittleness of the finished resin. For optimum electrical properties in the finished assembly, the plasticizer should be a low-loss material, such as a hydrocarbon or a fully fluorinated hydrocarbon. For less exacting electrical or non-electrical applications, other plasticizers may be used, including highly polar materials.

According to a specific embodiment of the invention, we use cross linked polymers in a manner which leads to unusual and desirable results. According to this embodiment, we initially treat the assembly with a mixture of polymerizable materials containing at least one monofunctional compound and at least one bi-functional compound such as a di-vinyl compound, a di-allyl compound or a conjugated diene. The mixture is polymerized to produce opaque polymers of relatively low density and high porosity. Following this polymerization the assembly is impregnated with a second polymerizable compound which is incompatible with the first. The initial copolymer is substantially insoluble in the impregnating material, and thus will not be affected by the second treatment. The second polymerization is carried out under conditions such that a high density non-porous copolymer or homopolymer is produced. Specific mono- and bifunctional materials which may be reacted with one another for the formation of the initial low density polymers are:

| Mono-Functional Compound | Bi-Functional Compound |
|---|---|
| styrene. | diallyl oxalate. |
| N-vinyl-carbazole. | diallyl maleate. |
| chloro styrenes. | butadiene. |
| 2-vinyl thiazole. | diallyl phthalate. |
| vinyl-dibenzofurans. | divinyl benzene. |
| | divinyl tetrachlorobenzene. |
| | allyl cinnamate. |
| | 2-chloro-allylcrotonate. |

Divinyl benzene is a particularly satisfactory cross linking agent and may be employed in very low concentrations. An excellent low density porous polymer can be produced by copolymerizing styrene with divinyl benzene by use of heat alone.

The amount by weight of divinyl benzene which is reacted with the styrene varies from about .07 to about .5% at 55° C. polymerization temperature, from about .3% to about .8% at 80° C. polymerization temperature, and from about .8% to about 1.8% at 100° C. polymerization temperature. The presence of polymerization catalysts generally should be avoided for best results. Similar amounts of divinyl benzene may be reacted with other monofunctional compounds.

Following preparation of the low density polymer, the impregnating treatment can be carried out with the impregnating resins or, if desired in this particular embodiment, even with the exact mixture used for preparation of the porous, low density polymer. However, in the latter case, polymerization should be carried out at a higher temperature than the initial polymerization treatment, usually at least 20° C. higher, and in the presence of a catalyst, such as benzoyl peroxide.

It is possible to produce extremely porous resin masses in the initial treatment by mixing with the initial resin a foam-producing agent. The polymerization reaction is conducted vigorously, in order that the bubbles derived from the foam-producing agent will rupture and provide a porous structure for the second impregnant.

Our invention may be more readily understood by a consideration of the following illustrative examples wherein the quantities are stated in parts by weight, unless otherwise noted and the appended drawing in which a partially unrolled and partially broken away condenser of the invention is illustrated:

The figure shows a condenser comprising two convolutely wound electrode foils 1, 2 separated by two films 3, 4 of porous resin. The pores of these films are impregnated with an in situ polymerized resin which is substantially incompatible with the porous resin and is represented by the stippling 5. The electrode foils 1, 2 are each provided with a terminal lead, not shown, for suitable connection in the desired circuit.

*Example 1*

A condenser was produced by convolutely winding two aluminum foils .003" thick separated by two sheets of cellulose acetate film .0006" thick, as in the figure. The foil was 1" wide and the film 1¼" wide. A total of 25 square inches of each foil was wound. The cellulose acetate film, as wound, consisted of 78% high viscosity cellulose acetate and 22% ethylene glycol monomethyl ether as a plasticizer. The wound condenser was heated to 105° C. and held under an absolute pressure (vacuum) of 0.5 mm. Hg for 48 hours. At the end of this time, the plasticizer had been removed, and the temperature was lowered to 85° C. Molten N-vinyl carbazole was introduced into the tank, until the condenser was covered. The vacuum was then broken to increase the pressure and effect complete impregnation of the condenser with the vinyl carbazole. Thereafter, at atmospheric pressure, the condenser was heated for 24 hours at 130° C. to effect polymerization in situ of the N-vinyl carbazole. The resulting condenser was a solid, non-porous, durable unit which could be operated at temperatures as high as 125° C. without failure. Its breakdown voltage was about 2500 volts.

*Example 2*

A condenser was produced by convolutely winding two .0003" aluminum electrode foils separated by four .0003" calendered kraft condenser tissues. The total area of each foil (1" wide) was 25 square inches, and the width of the paper was 1¼". The paper had a porosity of about 30%.

The condenser was dried at 105° C. under an absolute pressure of 0.5 mm. Hg for 8 hours and then removed from the drying chamber. At room temperature, the condenser was immersed in a solution containing about 18% low viscosity cellulose acetatebutyrate, 77% acetone and 5% ethyl lactate. A vacuum of 2 mm. was drawn to remove the air from the condenser section. Then the vacuum was broken and the condenser impregnated with the resin solution.

The solvent was removed by baking the condenser for 10 hours at 105° C. under 10 mm. absolute pressure.

Thereafter, the condenser was impregnated at 60° C. with 2,5-dichlorostyrene. The styrene was polymerized by heating at 95° C. in a closed vessel for 28 hours. The resulting assembly was a hard, non-porous durable unit with a breakdown voltage of about 1250 volts. It could be operated at 115° C. without failure.

*Example 3*

A paper condenser similar to the unit described in Example 2 was dried and impregnated under 0.5 mm. absolute pressure at 40° C. with a solution of 99.4% styrene and 0.6% mixed o- and p-divinyl benzene. The impregnated condenser was heated in a closed chamber at 80° C. for 36 hours. At the end of this time, the surface of the condenser had a crusty milky white coating of resin. The condenser was then re-impregnated with the same solution at 40° C. and 0.5 mm. absolute pressure and thereafter held at 130° C. in a closed chamber for 48 hours.

The finished condenser was a hard, non-porous durable unit with a breakdown voltage of about 1300 volts.

*Example 4*

A condenser was produced by the procedure described in Example 1, with the exception that the initial dielectric spacer consisted of .0005" regenerated cellulose containing 23% ethylene glycol as a plasticizer.

The finished condenser could be operated at 130° C. without failure and had a breakdown voltage of about 1900 volts.

*Example 5*

An I. F. transformer for a superheterodyne circuit was produced with copper wire which had been coated with a thin layer of an alkyd enamel and wound on a steatite core. The assembly was mounted in an aluminum can 1" square and 3" high. The can was inverted, placed in a vacuum chamber and dried under 0.5 mm. Hg at 60° C. for 10 hours. At the end of this time, a solution of 1.3% p-divinyl benzene and 98.7% styrene was introduced into the tank and the vacuum broken. The impregnated and filled can was then held at 100° C. for 60 hours. At the end of this time, the solution had polymerized to an opaque mass which had overflowed the can. The excess material was cut off and the can re-impregnated at 40° C. with a solution of 5% p-divinyl benzene, 0.1% benzoyl peroxide and 94.9% styrene. The impregnated can was held in a closed chamber at 95° C. for 24 hours, then at 110° C. for 8 additional hours. The resultant transformer was unaffected by moisture, shock and vibration and could be operated over a temperature range of from —40° C. to 120° C. without failure.

*Example 6*

A Nichrome wire .002" in diameter was provided with a .0003" coating of a plasticized polyvinyl butyral resin from a solution containing 4% polyvinyl butyral resin, 2% di-propylene glycol and 94% butanol. The butanol was removed after each pass through the coating solution, leaving the di-propylene glycol as a plasticizer.

The coated wire was wound upon a molded phenol-formaldehyde resin bobbin to form a coil with an I. D. of 0.4", and O. D. of .85" and a width of 0.55". The coil was then heated for 48 hours at 95° C. under 0.5 mm. absolute pressure to remove moisture and the di-propylene glycol. The temperature was then raised to 115° C. and molten 2,3,4,5,6-pentachlorostyrene added until the coil was covered thereby. The vacuum was broken and the impregnated coil heated at 130° C. for 72 hours to effect polymerization of the styrene. The resultant resistance coil could be operated at hot spot temperatures up to about 150° C., and was unusually resistant to shock, vibration, flame and moisture.

It is apparent that our invention is applicable to numerous electrical and mechanical assemblies wherein solid, nonporous, durable structures are required.

The condensers of Examples 1, 2, 3 and 4 have been provided with heat and pressure molded condensation and thermoplastic resin casings without failure or appreciable distortion. In many cases, the molding temperature exceeds the softening temperature of one or both of the resin ingredients of the assembly. Unexpectedly, and perhaps due to the incompatibility of the two resins and frictional forces at their interfaces, such high temperature mouldings were carried out successfully.

In many instances, it is desirable to combine the second resin treatment with the application of a relatively thick insulating casing about the assembly. This can be done readily by our invention, thereby eliminating the necessity of a separate step. The condenser or other device, after the initial resin treatment, is mounted in a mold, which has an opening in the top. Through the opening the second resin may be added, not only to impregnate the device but also to provide, upon polymerization, an insulating resin casing. The preparation of the transformer of Example 5 is representative of this procedure, since the aluminum can would serve as a mold and could be removed after polymerization of the second resin.

The compatibility of the first and second resins may be determined in the following manner. A 10 gram sample of the finished first resin is prepared in a lump form with particle size between 10 and 30 mesh. This sample is placed in a 150 cc. beaker and a 50 cc. of the second or impregnating resin added. Agitation is carried out on the mixture at the desired impregnating temperature for 4 hours (or less if the impregnant polymerizes rapidly). The second resin, still liquid, is drained off and the particles of the first resin washed twice with a non-solvent. The particles are then quickly dried with a hot air blast and weighed. If the gain in weight exceeds about 2%, the resins are at least partially compatible. The particles may be re-sieved to determine if coagulation has occurred.

Another series of resins suitable for the second resin impregnation comprises polymerizable liquid mixtures or solutions of polyesters and polymerizable vinyl compounds. For example, a suitable impregnant for a first resin which comprises an opaque, insoluble styrene-divinyl benzene copolymer, is 40% styrene and 60% diallyl fumarate. This impregnant can be cured at 110° for 48 hours to a tough, durable state, when a catalyst comprising 0.2% acetyl peroxide is employed.

As many apparently widely different embodiments of this invention may be made without departing from the spirit and scope hereof, it is to be understood that the invention is not limited to the specific embodiments hereof, except as defined in the appended claims.

We claim:
1. An electrical conductor on the surface of which is a porous resin film, the pores of which are impregnated with an in situ polymerized resin which is substantially incompatible with said porous resin.

2. An electrical condenser comprising convolutely wound electrode foils separated by a paper spacer having a porous resin surface, the pores of said resin surface being substantially filled with an incompatible in situ polymerized resin.

3. An electrical condenser comprising convolutely wound electrode strata separated by a porous cellulose acetate spacer, the pores of said spacer being substantially filled with in situ polymerized N-vinyl carbazole.

4. An electrical condenser comprising convolutely wound electrode foils separated by a porous paper spacer, the pores of said spacer being impregnated with cellulose acetate, said cellulose acetate having a porous surface, the pores of which are filled with in situ polymerized N-vinyl carbazole.

5. An electrical condenser comprising convolutely wound electrode foils separated by porous paper impregnated with a copolymer of a vinyl compound and a cross linking agent, said copolymer having a porous surface the pores of which are substantially completely filled by an in situ copolymerized mixture of a vinyl compound and a cross linking agent.

6. A process for producing a durable, non-porous article which comprises applying a porous resin coating film to the surface of an electrical conductor, impregnating the pores of said resin with an incompatible resin which is in liquid form and incompletely polymerized, then heating said impregnating resin to polymerize it in situ.

7. A process for producing rigid electrical condensers which comprises convolutely winding electrode foils separated by porous paper spacers, impregnating the wound unit with a solution containing from about 5% to about 50% of cellulose acetate in a solvent, removing said solvent, to produce a porous assembly, impregnating the pores of said assembly with a liquid polymerizable vinyl compound substantially incompatible with cellulose acetate and polymerizing said vinyl compound in situ.

8. A process for producing a hard non-porous electrical condenser which process comprises convolutely winding electrode ribbons with paper spacers, impregnating the wound assembly with a polymerizable resin, polymerizing said resin in the impregnated assembly, impregnating the pores of the resulting article with a second polymerizable resin incompatible with the first resin, and polymerizing said incompatible resin in situ.

9. A process for producing a hard, non-porous electrical condenser, which comprises convolutely winding electrode foils with paper spacers, incorporating a polymerizable resin within said assembly, impregnating the pores of the resultant article with a second polymerizable resin which is incompatible with the first resin, and polymerizing said incompatible resin in situ.

10. A condenser of claim 2 wherein the porous resin surface is a diallyl phthalate and the in situ polymerized resin is also a diallyl phthalate.

11. An electrical condenser comprising convolutely wound electrode foils separated by porous paper impregnated with a copolymer of a vinyl compound, said copolymer having a porous surface, the pores of which are substantially completely filled by an in situ polymerized vinyl compound.

12. A condenser of claim 11 wherein the copolymer of a vinyl compound is divinyl benzene-styrene and the in situ polymerized vinyl compound is styrene.

References Cited in the file of this patent

UNITED STATES PATENTS

| Number | Name | Date |
|---|---|---|
| 1,785,479 | Dubilier | Dec. 16, 1930 |
| 2,014,399 | Sprague | Sept. 17, 1935 |
| 2,147,824 | Webb | Feb. 21, 1939 |
| 2,245,708 | Patton | June 17, 1941 |
| 2,253,967 | Carl et al. | Aug. 27, 1941 |
| 2,303,283 | Kirkwood | Nov. 24, 1942 |
| 2,307,488 | Clark | Jan. 5, 1943 |
| 2,360,367 | Ruben | Oct. 17, 1944 |
| 2,389,733 | Lee | Nov. 27, 1945 |
| 2,414,320 | Miller | Jan. 14, 1947 |
| 2,421,652 | Robinson et al. | June 3, 1947 |
| 2,456,381 | Clark | Dec. 14, 1948 |
| 2,497,066 | Brennan | Feb. 14, 1950 |
| 2,518,454 | Elliott | Aug. 15, 1950 |
| 2,526,330 | Clark | Oct. 17, 1950 |

FOREIGN PATENTS

| Number | Country | Date |
|---|---|---|
| 355,318 | Great Britain | Aug. 12, 1931 |
| 416,735 | Great Britain | Sept. 20, 1934 |
| 533,196 | Great Britain | Feb. 7, 1941 |
| 590,966 | Great Britain | Aug. 1, 1947 |